US007023674B2

(12) United States Patent
Gross et al.

(10) Patent No.: US 7,023,674 B2
(45) Date of Patent: Apr. 4, 2006

(54) OVERLOAD PROTECTOR FOR ELECTRICAL MOTORS

(75) Inventors: Gerhard Gross, Lauf (DE); Josef Foerstera, Buehlertal (DE); Bernhard Merschroth, Ottersweier (DE); Michael Hanek, Renchen (DE)

(73) Assignee: Robert Bosch GmbH, Stuttgart (DE)

( * ) Notice: Subject to any disclaimer, the term of this patent is extended or adjusted under 35 U.S.C. 154(b) by 217 days.

(21) Appl. No.: 10/399,657

(22) PCT Filed: Oct. 13, 2001

(86) PCT No.: PCT/DE01/03930

§ 371 (c)(1),
(2), (4) Date: Sep. 8, 2003

(87) PCT Pub. No.: WO02/33721

PCT Pub. Date: Apr. 25, 2002

(65) Prior Publication Data

US 2004/0042147 A1 Mar. 4, 2004

(30) Foreign Application Priority Data

Oct. 21, 2000 (DE) ................................ 100 52 220

(51) Int. Cl.
*H02H 5/04* (2006.01)

(52) U.S. Cl. ........................................ 361/23; 337/407

(58) Field of Classification Search ................ 361/118, 361/111, 23; 318/445; 337/407
See application file for complete search history.

(56) References Cited

U.S. PATENT DOCUMENTS

| | | | | |
|---|---|---|---|---|
| 2,491,032 | A * | 12/1949 | Burke | 337/35 |
| 2,804,587 | A * | 8/1957 | Bregman | 318/445 |
| 4,319,126 | A * | 3/1982 | Lujic | 219/512 |
| 5,306,974 | A * | 4/1994 | Bates | 310/68 R |
| 5,637,967 | A * | 6/1997 | Kim | 318/376 |
| 5,896,080 | A * | 4/1999 | Chen | 337/407 |
| 6,198,643 | B1 * | 3/2001 | Gray | 363/39 |
| 6,348,851 | B1 * | 2/2002 | Wyser et al. | 337/411 |
| 6,737,770 | B1 * | 5/2004 | Sunaga et al. | 310/68 C |
| 6,876,533 | B1 * | 4/2005 | Ryan | 361/104 |

FOREIGN PATENT DOCUMENTS

| | | |
|---|---|---|
| DE | 2 125 116 | 11/1972 |
| DE | 3 045 540 | 6/1981 |
| FR | 968 991 | 12/1950 |
| FR | 2 510 811 | 2/1983 |

* cited by examiner

*Primary Examiner*—Brian Sircus
*Assistant Examiner*—Boris Benenson
(74) *Attorney, Agent, or Firm*—Ronald E. Greigg

(57) ABSTRACT

An overload protection for electric motors, includes a one-piece suppression choke in which the connecting point to be broken is produced by means of at least one connecting point between the connection lug of the motor and a respective connecting element of the suppression choke, wherein the connection lug exerts an adjustable mechanical stress on the connecting point, thus reliably assuring a break when the softening temperature of the solder of the breaking point is reached.

3 Claims, 1 Drawing Sheet

OVERLOAD PROTECTOR FOR ELECTRICAL MOTORS

CROSS-REFERENCE TO RELATED APPLICATIONS

This application is a 35 USC 371 application of PCT/DE 01/03930 filed on Oct. 13, 2001.

BACKGROUND OF THE INVENTION

1. Field of the Invention

The invention is directed to an improved overload protection for electric machines such as electric motors and generators.

2. Description of the Prior Art

Electric machines, for example electric motors, frequently contain thermal circuit breakers, which protect the electric machine from destruction or fire in the event that its movement becomes jammed or restricted. Often a suppressor choke is used for this purpose, which is comprised of two parts soldered together at a connecting point, i.e. is comprised of a soldering point, using a solder with a particular melting temperature to form an intentional breaking point. When a carbon brush or a carbon brush cable heats the suppressor choke, this solder is heated and melts at a selected melting temperature. The windings of the suppressor choke exert a certain amount of initial stress on the suppressor choke and therefore on the connecting point so that when the soldering point softens, this connection should be broken. The electric circuit of the electric machine should then be permanently broken and the electric machine should be protected from being destroyed.

Frequently, however, the initial tension is not sufficient to assure a reliable breaking of the soldering point when the suppression choke is heated.

SUMMARY OF THE INVENTION

The overload protection for electric machines according to the invention has the advantage over the prior art that an electric machine can more reliably be protected from destruction or fire in a simple manner.

In order to exert the mechanical stress on the connecting point, it is advantageous to use a sheet metal strip that is electrically connected to a connecting element of the suppression choke.

Another advantageous embodiment of the connection lug is a helical spring.

BRIEF DESCRIPTION OF THE DRAWINGS

An exemplary embodiment of the invention is explained in detail herein below, with reference to the drawings, in which.

DESCRIPTION OF THE PREFERRED EMBODIMENT

Figure 1:
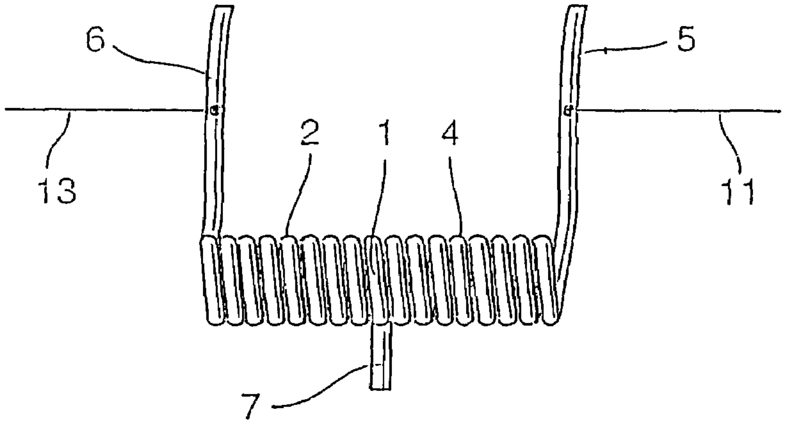
Fig. 1 Prior Art
FIG. 1 shows a suppression choke according to the prior art.

FIG. 1 shows a suppression choke according to the prior art, which is embodied in two parts and is comprised of a first part 2 and a second part 4. The first part 2 and the second part 4 are connected at a breaking point 7 with a solder. The solder melts at a particular temperature. The solder is selected according to its melting temperature, depending on the intended use.

Figure 2:
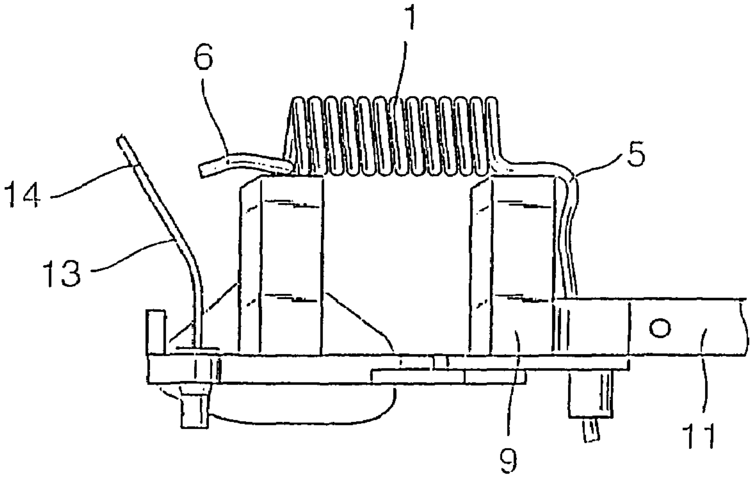
FIG. 2 shows a suppression choke of an overload protection according to the invention disposed in a brush holder.
Figure 3:
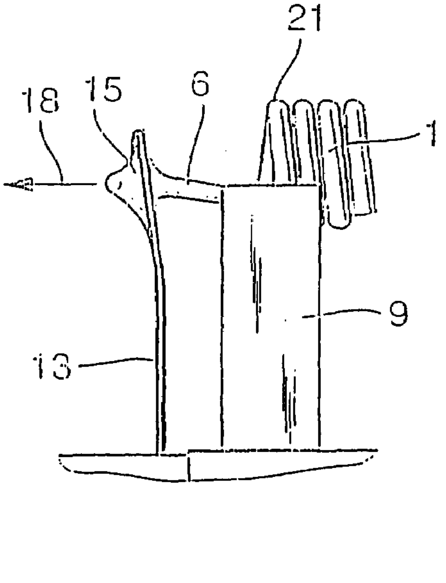
FIG. 3 shows a partial detail of an overload protection according to the invention.

The reference numeral for the suppression choke according to the prior art will also be used for the suppression choke 1 according to the invention (FIGS. 2, 3).

The suppression choke also has a first electrical connecting element 5 and a second electrical connecting element 6 for an electrical connection in an electrical circuit.

FIG. 2 shows the suppression choke 1 of an overload protection according to the invention partially installed in a brush holder 9. For example, the first connecting element 5 is connected to a first electrical connection lug 11, which is integrated into the brush holder 9. The connection lug 11 produces the connection to the electrical circuit of an electric machine. For example, the first connection lug 11 exerts no mechanical stress on the first connecting element 5 and its connecting point.

The second connecting element 6 of the suppression choke 1 is likewise connected electrically and mechanically to a second electrical connection lug 13. The second connection lug 13 is connected to another electrical line in the brush holder 9. It is necessary to exert a force to move the free end 14 of the second connection lug 13 toward the second connecting element 6 in order to fasten it to the second connecting element 6.

FIG. 3 shows how the second connection lug 13 is connected to the second connecting element 6. A connecting point 15, produced by means of soldering, constitutes the mechanical and electrical connection between the second connecting element 6 and the free end 14 of the second connection lug 13.

Starting from FIG. 2, this occurs as follows: through the exertion of a mechanical force, the free end 14 of the second connection lug 13 is bent toward the second connecting element 6 (parallel to 18) and, while maintaining the force, the connection is produced, for example by means of soldering. After the connecting point 15 is produced, for example after the solder cools, the force on the second connection lug 13 can be withdrawn. The second connection lug 13 then exerts a mechanical stress in the axial direction 18 on the connecting point 15.

It is also possible to use both of the connection lugs 11, 13 to exert a mechanical stress on the respective connecting points 15.

The connection lugs 11, 13 can also be helical springs.

The connecting point 15 of the connection lugs 11, 13 and the connecting elements 5, 6 assumes the function of the breaking point 7 of the suppression choke according to the prior art.

In the overload protection according to the invention, this breaking point 7 is eliminated. Instead, a connecting point 15 is used, which is also present in the prior art. In the prior art, the breaking point 7, which protrudes beyond the dimensions of the suppression choke, often causes a ground contact in the pole housing when the connecting point 7 is broken. This disadvantage is eliminated in the overload protection according to the invention.

Because there are two connecting points of connection lugs and connecting elements, it is also possible for both to be embodied in the form of connecting points to be broken in the event of an overload.

The foregoing relates to preferred exemplary embodiment of the invention, it being understood that other variants and embodiments thereof are possible within the spirit and scope of the invention, the latter being defined by the appended claims.

What is claimed is:

1. An overload protection for electric machines, comprising a suppression choke made from a coil of wire, wherein the wire which forms the coil of the choke extends from the coil at both ends of the coil and thus forms two electrical connecting elements each connected to an electrical connection lug of another electrical element at a respective connecting point, at least one of the connection lugs (11,13) exerting a mechanical stress away from the connecting point (15), the at least one connection lug being detachable from its respective electrical connection point when the suppression choke is heated as a result of its mechanical stress.

2. The overload protection according to claim 1, wherein the at least one connection lug (11,13) is a sheet metal strip, which exerts a force on the connecting point (15) in the axial direction of the coil.

3. An overload protection for electric machines, comprising a suppression choke made from a coil of wire, wherein the wire which forms the coil of the choke extends from the coil at both ends of the coil and thus forms two electrical connecting elements each connected to an electrical connection lug of another electrical element at a respective connecting point, at least one of the connection lugs (11,13) exerting a mechanical stress away from the connecting point (15), the at least one connection lug being detachable from its respective electrical connection point when the suppression choke is heated as a result of its mechanical stress, and the at least one connection lug (11,13) is a sheet metal strip.

* * * * *